Feb. 29, 1944. L. H. BURNS 2,342,788
WIRE CONNECTING SLEEVE
Filed July 21, 1942
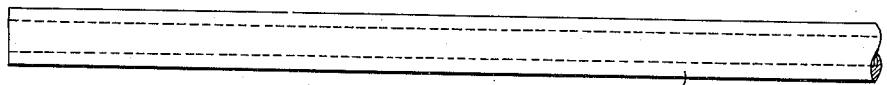
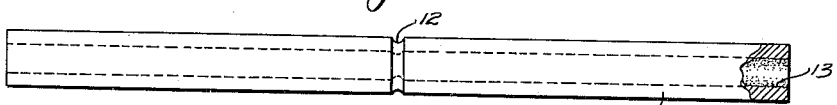
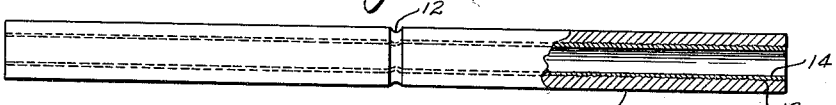
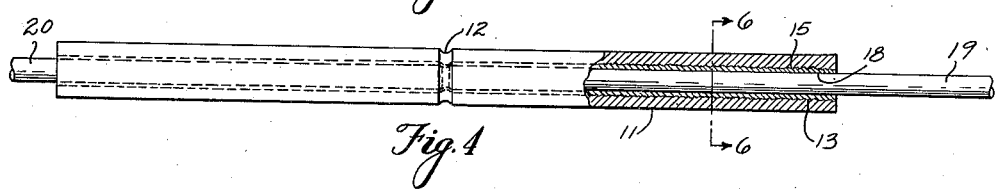
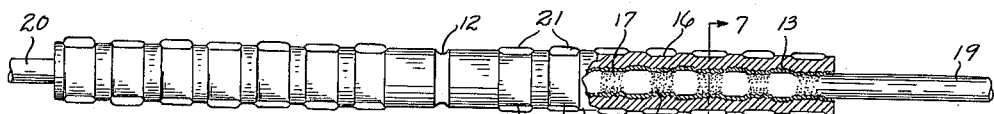
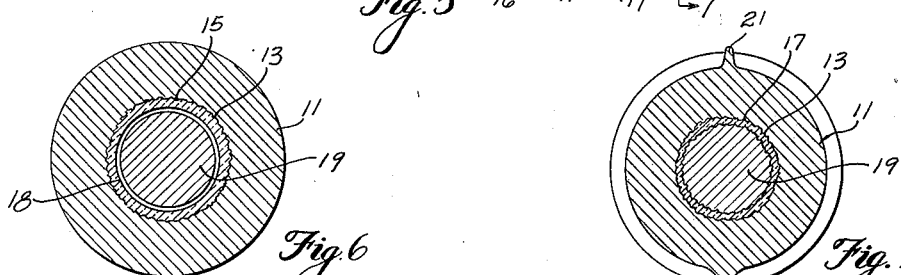
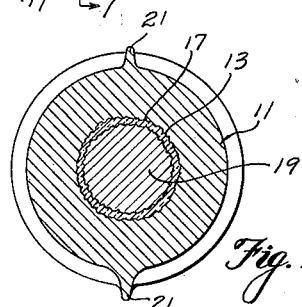
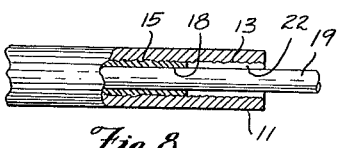
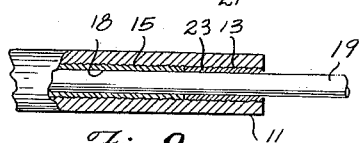
INVENTOR.
BY Leroy H. Burns
Woodling and Krost
attys Patented Feb. 29, 1944

2,342,788

UNITED STATES PATENT OFFICE 2,342,788

WIRE CONNECTING SLEEVE

Leroy H. Burns, Cleveland, Ohio, assignor to The National Telephone Supply Company, a corporation of Ohio Application July 21, 1942, Serial No. 451,808

2 Claims. (Cl. 16—108)

This invention relates to improvements in wire connecting devices and more particularly to wire connecting devices in the form of a sleeve for making joints in wires which are of high strength and which have a hard surface.

A great deal of difficulty has been experienced in making sleeve connecters for hard, high tensile bare steel wires. This difficulty arises from the fact that the wire is so hard that penetration into the surface thereof cannot be successfully attained by known methods used in joining softer wires together by compressing sleeves around the wires to be joined.

An object of my invention is to provide for coating the inside wall of a sleeve with a hard material which has the property of penetrating the hard, high tensile bare steel wires.

Another object of my invention is the provision of coating the inside wall of a wire connecting sleeve with fired procelain, so that when the sleeve is compressed upon the hard steel wire the porcelain is crushed into a multitude of hard, sharp particles which act as an abrasive between the wire and the sleeve to produce a high holding power for joining the wires together.

Other objects and a fuller understanding of my invention may be had by referring to the following description and claims, taken in conjunction with the accompanying drawing, in which:

Figure 1 represents a view of a tube from which my sleeve may be constructed;

Figure 2 is a view of a sleeve cut from the tube in Figure 1 and having the inner wall thereof sand blasted;

Figure 3 is a view of the sleeve in Figure 2 which shows the application of porcelain to the inner wall of the sleeve, the porcelain in Figure 3 being in a liquid or slip state;

Figure 4 is a view of the sleeve in Figure 3 after it has been fired, rendering the porcelain hard for the reception of the wires to be joined;

Figure 5 is a view of the sleeve after it has been compressed about the wire and showing particularly the manner in which the cracked or crushed porcelain pentrates the hard surface of the wires to be joined;

Figure 6 is an enlarged cross-sectional view taken along the line 6—6 on Figure 4, showing particularly the fired porcelain prior to it being compressed about the wire;

Figure 7 is a view similar to Figure 6 taken along the line 7—7 of Figure 5 and showing the disposition of the crushed porcelain after the sleeve has been compressed about the wires to be joined;

Figure 8 is a fragmentary view of the right-hand end of Figure 4 and shows a portion of the porcelain removed so that as the end of the sleeve is compressed about the wire there is an intimate metal to metal contact to provide a good electrical conductivity; and Figure 9 is a view similar to Figure 8 but shows a metal tube inserted into the end of the wire connected sleeve for making a metal to metal contact between the wire and the sleeve to provide a good electrical conductivity.

With reference to the drawing, my finished sleeve is shown in Figure 4 and comprises a metal sleeve 11 having the inner wall thereof coated with a thin layer of fired porcelain 15. In constructing the sleeve 11 I take a long tubular member such, for example, as illustrated in Figure 1 by the reference character 10 and cut it into pieces of suitable length to receive the ends of the wires to be joined. The center portion of the sleeve 11 may be rolled as indicated at 12 in order to provide a restriction in the internal diameter of the sleeve to act as stops for the insertion of the wires from opposite ends of the sleeve. In other words, the internal stops afforded by the external rolling of the sleeve prevents one wire from going beyond the longitudinal center of the sleeve in which event the other wire would not have the full benefit of the engagement by the sleeve. Prior to the application of the porcelain in a liquid state to the inner wall of the sleeve, I preferably provide for sand blasting the internal wall of the sleeve such as indicated by the reference character 13. After the sleeve is sand blasted, the next operation is to dip the sleeve into porcelain in a liquid state, after which the outside surface of the sleeve is wiped clean of the porcelain, thus leaving a thin layer of the liquid porcelain as indicated by the reference character 14 on the inner wall of the sleeve. After the sleeve is dipped and cleaned on the outside, the next operation is to fire the porcelain for making it hard and brittle and for bonding it to the inner wall of the sleeve, as illustrated in Figures 4 and 6. The fired porcelain may be the same as that used commercially as a finish on steel cooking utensils, metal signs, stove parts, etc. It is found that one dipping of the sleeve is sufficient to make a layer of porcelain suitable for joining hard surface wires, although more than one dip or application may be applied depending upon the desired thickness of the lining of porcelain, in which case the sleeve is fired after each dip or application of the porcelain slip.

The sleeve is made of malleable metal and may be pressed about the wires to be joined by any suitable means or other arrangement of dies or rolling tools. In actual practice, I preferably compress the sleeve about the wires to be joined by means of a constant movement toggle clamping tool having clamping dies for engaging the sleeve at spaced intervals. A constant movement toggle type of compression tool is arranged to move the dies inwardly during the compression of the sleeve about the wires a definite amount as determined by the adjustment or setting of the tool. I am not limiting myself to the type of tool for compressing the sleeve about the wires to be joined as a screw or cam actuated press, or a hydraulic ram can be used and are even more desirable on the larger sizes than a constant movement toggle tool. Other tools which can be used are the impact tool and the rolling tool. The Figure 5 shows a sleeve which has been compressed by a constant movement toggle tool and the reference character 16 represents the compressed portions along the sleeve as effected by the dies of the constant movement toggle tool. The flashes or the flow of excess metal between the mating edges of the dies of the tool are indicated by the reference character 21. When the sleeve is compressed, the porcelain is crushed into a multitude of hard, sharp particles which act as an abrasive between the wire and the sleeve to give a good gripping engagement between the sleeve and the wire. The crushed porcelain is indicated by the reference character 17 and has the property of penetrating into the hard surface of the wires to be joined as well as into the inner wall surface of the sleeve, see Figures 5 and 7. Another desirable feature of the porcelain lining is the fact that it is relatively smooth and no difficulty is encountered in inserting the wires into the sleeve. Figure 6 shows the feature that the porcelain makes a smooth wall finish which obviates any difficulty of inserting the wires into the sleeve. The smooth inner wall of the porcelain is indicated by the reference character 18 and the wires to be joined are indicated by the reference characters 19 and 20. In adapting the sleeve for electrical conduction, I preferably use either one of two arrangements as shown in Figures 8 and 9. In Figure 8 I remove a portion of the porcelain lining as indicated by the reference character 22 so that when the right-hand end of the sleeve in Figure 8 is compressed against the wire 19 there is provided a metal to metal contact to give good electrical conductivity. The porcelain may be removed before it is fired. In Figure 9 I show an arrangement of inserting a metal tube 23 which when the sleeve is compressed upon the wires, provides a metal to metal contact between the wires and the sleeve to give good conductivity. The tube 23 takes up the space left vacant as indicated by the reference character 22 in Figure 8.

In my invention the porcelain lining may be considered a sleeve bonded to the inner wall of the malleable outer sleeve 11. The thickness of the porcelain lining is relatively thin compared to the thickness of the wall of the surrounding metal sleeve. Tests show that my invention with the use of porcelain gives a large holding or gripping action between the sleeve and the wire and results from the fact that the porcelain is sufficiently hard to penetrate the hard outer surface of the wires to be joined and the inner wall surface of the sleeve.

The terms "wire" and "tubular body" as used herein are not limited to the showings in the drawing, as obvious variations may be employed. The end-to-end disposition of the joined wires to give a butt connection is not necessarily restricted to the arrangement illustrated in the drawings, as such variations may be made that wall within the scope of the invention as claimed.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A wire connecting sleeve comprising a tubular body formed of malleable metal whose inner wall is coated with a relatively thin layer of wire engaging material formed of fired porcelain bonded thereto.

2. A wire connecting sleeve comprising an exterior tubular body formed of malleable metal and an interior tubular body of thinner construction than the exterior body and formed of fired porcelain, said fired porcelain being bonded to the inner wall of the exterior body.

LEROY H. BURNS.